United States Patent
Chung et al.

(10) Patent No.: US 6,442,124 B1
(45) Date of Patent: Aug. 27, 2002

(54) COMPATIBLE OPTICAL PICK-UP APPARATUS FOR RECORDING AND REPRODUCING INFORMATION FROM RECORDING MEDIA HAVING DIFFERENT FORMATS

(75) Inventors: Chong-sam Chung, Sungnam; Yong-hoon Lee; In-shik Park, both of Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/219,342

(22) Filed: Dec. 23, 1998

(30) Foreign Application Priority Data

Mar. 14, 1998 (KR) ............................................. 98-8644

(51) Int. Cl.$^7$ .............................................. G11B 7/135
(52) U.S. Cl. .................................. 369/112.07; 369/121
(58) Field of Search ................................ 369/112, 121, 369/112.06, 112.07

(56) References Cited

U.S. PATENT DOCUMENTS

| | | | | |
|---|---|---|---|---|
| 5,235,581 A | * | 8/1993 | Miyagawa et al. | 369/112.24 X |
| 5,281,797 A | * | 1/1994 | Tatsuno et al. | 369/118 X |
| 5,517,480 A | * | 5/1996 | Matsuoka et al. | 369/112 X |
| 5,526,338 A | * | 6/1996 | Hasman et al. | 369/112.13 X |
| 5,646,929 A | * | 7/1997 | Choi | 369/44.12 X |
| 5,648,870 A | * | 7/1997 | Mistutake | 359/487 |
| 5,696,747 A | * | 12/1997 | Bartholomeusz | 369/100 |
| 5,696,750 A | * | 12/1997 | Katayama | 369/112 |
| 5,703,856 A | * | 12/1997 | Hayashi et al. | 369/54 |
| 5,777,975 A | * | 7/1998 | Horinouchi et al. | 369/112 O |
| 5,784,354 A | * | 7/1998 | Lee | 369/112 O |
| 5,835,472 A | * | 11/1998 | Horie et al. | 369/112 X |
| 5,856,965 A | * | 1/1999 | Tsuchiya et al. | 369/112 X |
| 5,930,214 A | * | 7/1999 | Kasahara et al. | 369/53.2 |
| 5,940,360 A | * | 8/1999 | Choi | 369/112 |
| 5,995,473 A | * | 11/1999 | Choi | 369/112 O |
| 6,005,835 A | * | 12/1999 | Tsuji et al. | 369/112 |
| 6,163,409 A | * | 12/2000 | Uchiyama et al. | 359/634 |

FOREIGN PATENT DOCUMENTS

| | | |
|---|---|---|
| JP | 8-55363 | 2/1996 |
| JP | 9-274730 | 10/1997 |
| JP | 10-055566 | 2/1998 |

* cited by examiner

Primary Examiner—Aristotelis M. Psitos
(74) Attorney, Agent, or Firm—Staas & Halsey LLP

(57) ABSTRACT

An optical pick-up apparatus for recording and reproducing information from recording media using a first, second, and third light source to emit light beams having various wavelengths corresponding to a first, second and third recording media, respectively. A dichroic beam splitter has a first, second, and third input surface for receiving the light beams emitted from the first, second and third light sources, respectively, and an output surface through which the light beams received through the input surfaces is transmitted toward the first, second, and third recording media. A converging device converges the light beams transmitted through the output surface of the dichroic beam splitter toward the first, second, and third recording media, and a photodetector receives light beams reflected from the first, second, and third recording media that has been transmitted through the dichroic beam splitter.

17 Claims, 5 Drawing Sheets

COMPATIBLE OPTICAL PICK-UP APPARATUS FOR RECORDING AND REPRODUCING INFORMATION FROM RECORDING MEDIA HAVING DIFFERENT FORMATS

CROSS-REFERENCE TO RELATED APPLICATIONS

This application claims the benefit of Korean Application No. 98-8644, filed Mar. 14, 1998 in the Korean Patent Office, the disclosure of which is incorporated herein by reference.

BACKGROUND OF THE INVENTION

1. Field of the Invention

The present invention relates to a compatible optical pick-up apparatus for recording and reproducing information from recording media having various formats, and more particularly, the present invention relates to an optical pickup apparatus for recording and reproducing information from recording media using light sources to emit light beams having different wavelengths corresponding to the recording media of the various formats.

2. Description of the Related Art

An optical pick-up apparatus employed in a compact disk player (CDP), a digital versatile disk player (DVDP), a CD-ROM driver or a DVD-ROM driver, records and/or reproduces information on or from a recording medium in a non-contact manner. The recording medium has a standardized size, so that an increase in the information recording density with respect to a recording layer of a predetermined size is required, for which much research is currently being conducted.

A digital versatile disk (DVD) or a high density DVD (HD-DVD) is a high capacity disk that is capable of recording a large amount of information. The DVD has a standardized thickness that differs from the thickness of CD related devices, such as a compact disk (CD), a CD-recordable (CD-R) medium, a CD-I, and a CD-G, with reference to an allowable error of a mechanical disk gradient and a numerical aperture of an object lens.

For example, the numerical aperture of the object lens of the optical pick-up apparatus for recording and/or reproducing information on and from the CD is 0.45, while the numerical aperture of the optical pick-up apparatus for recording and/or reproducing information on and from the DVD is 0.6, in order to increase the recording and reproduction density. Due to an allowable error of the mechanical disk gradient that results from using an object lens having large numerical apertures, the thickness of the CD is 1.2 mm, and the thickness of the DVD is 0.6 mm. In the same way, the thickness of the HD-DVD also will be standardized to 0.6 mm.

Furthermore, wavelengths of the reproducing light sources used for the DVD are different from those used for the CD. For example, the wavelength of a light source for reproducing information from a conventional CD is approximately 780 nm, while the wavelength of a light source for reproducing information from a conventional DVD is in a range from approximately 635 nm to 650 nm. A light source emitting light beams of a shorter wavelength in a range from approximately 410 nm to 420 nm is used when reproducing information from the HD-DVD.

The thicknesses of the CD and DVD differ so that if information is recorded and/or reproduced on and from the CD by an optical pick-up apparatus for a DVD, a spherical aberration is generated due to the difference in the thicknesses. Therefore, the optical intensity required to record the information cannot be obtained, or the reproducing signal deteriorates.

A compatible optical pick-up apparatus for a DVD that is capable of reproducing information from a CD includes a light source that emits a light beam that has a wavelength of approximately 650 nm, a beam splitter for directing incident light beams, an object lens for converging a light beam to form a light spot on a recording surface of a disk, and a photodetector for detecting an error signal and an information signal. In this case, the numerical aperture of the object lens is 0.6.

If an object lens, in which an annular optical control pattern is formed, is employed, the spherical aberration caused by the difference in the thicknesses of the disks can be compensated for, to thereby compatibly employ disks having different thicknesses.

In other words, the optical pick-up apparatus includes a light source for the DVD and means capable of compensating for the difference in thicknesses of employed disks, to thereby allow CD reproduction. When reproducing information from the CD, deterioration of approximately 5% is generated, compared to an optical pick-up apparatus employing a light source for a CD emitting light beams that have a wavelength of 780 nm, which is within a range of a reproducing allowable error.

However, if a CD related device, such as a CD-R is employed, along with light sources that have wavelengths of 650 nm and 780 nm, sensitivities are different from each other. For example, the CD-R includes a recording layer of an organic pigment film, so that a difference in reflectivities in accordance with wavelengths of light is great. As a result, the reflectivity is high when using light beams that have a wavelength of 780 nm, while the reflectivity deteriorates to 10% or less when using light beams that have a wavelength of approximately 650 nm, to thereby reproduce no information.

In addition, in the optical pick-up apparatus for the HD-DVD that employs a light source emitting light beams that have a wavelength of approximately 410 nm, recording and reproduction with respect to a CD-R and an expected DVD-R is not possible.

SUMMARY OF THE INVENTION

It is an object of the present invention to provide a compatible optical pick-up apparatus allowing recording media having various formats to have information recorded thereon and reproduced therefrom.

Additional objects and advantages of the invention will be set forth in part in the description which follows and, in part, will be obvious from the description, or may be learned by practice of the invention.

Accordingly, to achieve the above and other objects of the present invention, there is provided an optical pick-up apparatus for recording and reproducing information from first, second, and third recording media. A first light source emits a light beam that has a wavelength corresponding to the first recording medium, a second light source emits a light beam that has a wavelength corresponding to the second recording medium, and a third light source emits a light beam that has a wavelength corresponding to the third recording medium. A dichroic beam splitter has a first input surface, a second input surface, and a third input surface to receive the light beams emitted from the first, the second and the third light sources, respectively, and an output surface through which the light beams received by the first, the second, and the third input surfaces are transmitted toward the first, the second, and the third recording media, respectively. A converging device converges the light beams transmitted through the output surface of the dichroic beam splitter toward the first, the second, and the third recording media, respectively, and photodetectors receive the light beams reflected from the first, the second, and the third recording media, respectively.

The dichroic beam splitter has a first slant reflection surface to transmit the light beam output from the first light source and to reflect the light beam output from the second light source toward the output surface, and a second slant reflection surface to transmit the light beam output from the first light source and to reflect the light beam emitted from the third light source toward the output surface. The first and the second slant reflection surfaces are formed by alternately repeatedly stacking dielectric layers having different refractivities, and the dielectric layers are preferably alternately formed of $MgF_2$ and $TiO_2$, $SiO_2$ and $ZrO_2$, $Al_2O_3$ and $ZrO_2$, $MgF_2$ and $ZrO_2$, $SiO_2$ and $TiO_2$, or $Al_2O_3$ and $TiO_2$.

Objects of the invention are also achieved by providing an optical pick-up apparatus for recording and reproducing information from first and second recording media that includes a first light source and a second light source to emit light beams that have wavelengths corresponding to the first and second recording media. A dichroic beam splitter has input surfaces to receive the light beams emitted from the first and the second light sources, and an output surface through which the light beams received by the input surfaces are transmitted toward the first and the second recording media, respectively. A converging device converges the light beams transmitted through the output surface of the dichroic beam splitter to the first and the second recording media, respectively, and photodetectors receive the light beams reflected from the first and the second recording media, respectively.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
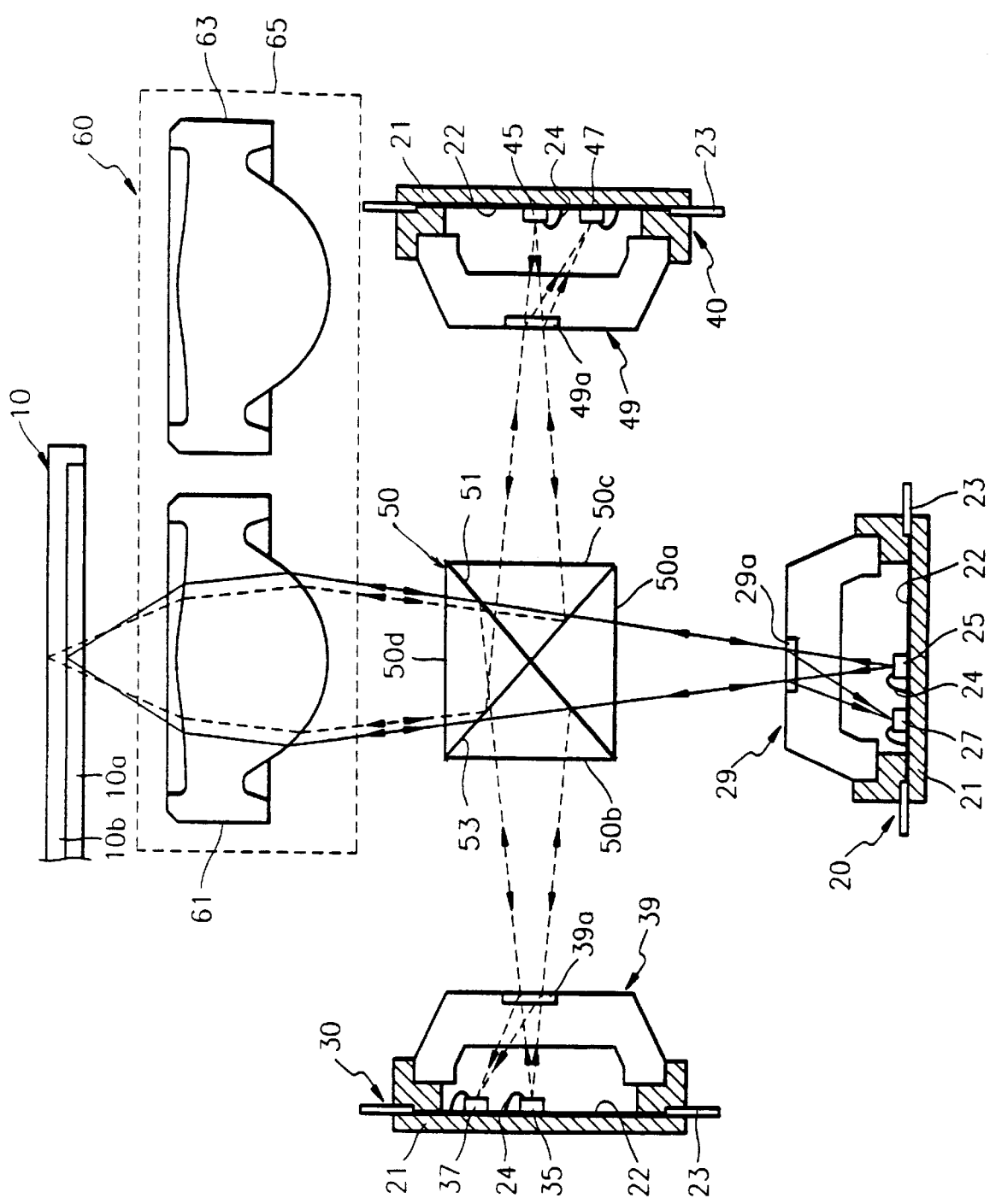
FIG. 1 is a schematic view of an optical arrangement of a compatible optical pick-up apparatus according to a first embodiment of the present invention.

Reference will now made in detail to the present preferred embodiments of the present invention, examples of which are illustrated in the accompanying drawings, wherein like reference numerals refer to the like elements throughout.

The embodiments are described below in order to explain the present invention by referring to the figures.

As illustrated in FIG. 1, a compatible optical pick-up apparatus according to a first embodiment of the present invention includes a first light source 25, a second light source 35, and a third light source 45 that radiate corresponding light beams having different wavelengths. A dichroic beam splitter 50 includes three input surfaces 50a, 50b and 50c receiving light beams from the first, second and third light sources 25, 35 and 45, respectively, and an output surface 50d. A converging device 60 is arranged along a light path between the dichroic beam splitter 50 and a recording medium 10, and first through third photodetectors 27, 37 and 47 receive the light beams that are reflected from the recording medium 10 (of a corresponding type) and that pass through the dichroic beam splitter 50.

The first light source 25 emits a light beam having a wavelength of approximately 5 410nm, for reproducing information from an HD-DVD. The second light source 35 and the third light source 45 emit light beams that have a wavelength of 650 nm and 780 nm for reproducing information from a DVD and a CD, respectively. The light sources 25, 35 and 45 are selectively driven in accordance with the recording medium 10 that is employed (loaded in an optical drive apparatus of an optical disk player).

The light beams reflected from the recording medium 10 (the corresponding type loaded in the optical drive apparatus) are received in the first through third photodetectors 27, 37 and 47 through first through third hologram elements 29, 39 and 49, respectively. The first through third hologram elements 29, 39, and 49 function as light path converting means and are installed in light paths between the dichroic beam splitter 50 and the first through third photodetectors 27, 37 and 47, respectively.

The first through third light sources 25, 35 and 45 may be combined with the first through third photodetectors 27, 37 and 47, respectively, to form first through third light modules 20, 30 and 40, respectively.

The first through third light sources 25, 35 and 45 and the first through third photodetectors 27, 37 and 47 are installed on corresponding bases 21 of the first through third light modules 20, 30 and 40. Substrates 22 are respectively provided on the bases 21 and are electrically connected to the corresponding first through third light sources 25, 35 and 45 and the corresponding first through third photodetectors 27, 37 and 47 with wires 24, and the first through third light modules 20, 30 and 40 are connected to external circuits by respective lead frames 23.

First through third hologram patterns 29a, 39a and 49a are formed in the hologram elements 29, 39 and 49, respectively, so that light beams radiated from the first through third light sources 25, 35 and 45 are transmitted to the corresponding types of the recording medium 10, and the light beams reflected from the corresponding types of the recording medium 10 are diffracted and transmitted to the first through third photodetectors 27, 37 and 47, respectively. The first through third hologram patterns 29a, 39a and 49a may be changed in accordance with the wavelengths of the light beams emitted from the light sources 25, 35 and 45.

The first through third hologram elements 29, 39 and 49 are preferably compactly modulated together with the respective first through third light sources 25, 35 and 45 and the respective first through third photodetectors 27, 37 and 47.

A beam splitter (not shown) may also be employed as the light path converting means, in which case the first through third photodetectors 27, 37 and 47 would be arranged corresponding to the beam splitter.

The dichroic beam splitter 50 may be constructed by bringing four prisms each having a refractivity of, for example, 1.52, into contact with each other. The paths of the light beams received from the first, second and third light sources 25, 35 and 45 through the three input surfaces 50a, 50b and 50c of the dichroic beam splitter 50, respectively, are diverted to the output surface 50d by a first slant reflection surface 51 and a second slant reflection surface 53.

The first slant reflection surface 51 preferably transmits the light beams emitted from the first and third light sources 25 and 45 and reflects the light beam emitted from the second light source 35, and the second slant reflection surface 53 transmits the light beams emitted from the first and the second light sources 25 and 35 and reflects the light beam emitted from the third light source 45. The first and second slant reflection surfaces 51 and 53 are formed by repeatedly alternately stacking dielectric layers having different refractivities in relation to an adjacent dielectric layer such that a light beam is selectively transmitted or reflected according to the wavelength of the light beam.

Preferably, $MgF_2$ having a refractivity of 1.38, $SiO_2$ having a refractivity of 1.46, $Al_2O_3$ having a refractivity of 1.64, $ZrO_2$ having a refractivity of 2.1 or $TiO_2$ having a refractivity of 2.3 may be used as the dielectric materials.

Figure 2A:
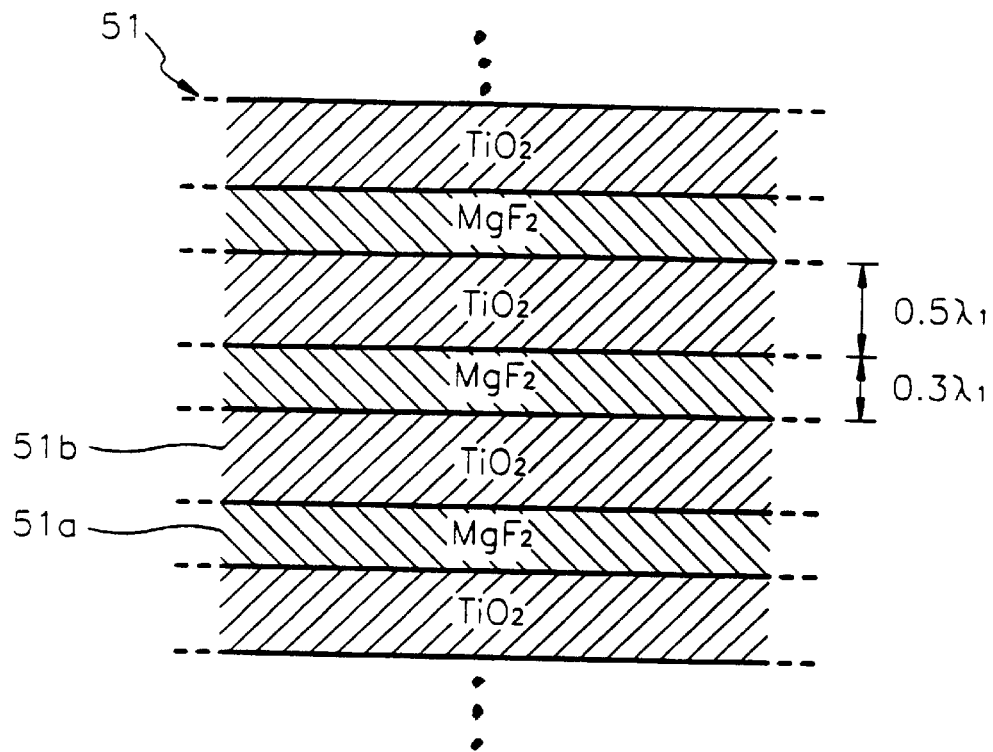
FIGS. 2A and 2B are sectional views of a first slant reflection surface and a second slant reflection surface shown in FIG. 1, respectively.

As illustrated in FIG. 2A, the first slant reflection surface 51 is formed by repeatedly alternately stacking a first dielectric layer 51a formed of $MgF_2$ which has a refractivity of approximately 1.38 and a thickness of $0.3\lambda_1$, and a second dielectric layer 51b formed of $TiO_2$ which has a refractivity of approximately 2.3 and a thickness of $0.5\lambda_1$, where $80_1$ indicates a reference wavelength of approximately 1040 nm.

If the first and second dielectric layers 51a and 51b are alternately stacked with twenty layers, the reflectivities of the first slant reflection surface 51 with respect to light beams having wavelengths of 410 nm, 650 nm and 780 nm become approximately 0.2%, 99.1% and 0.8%, respectively. As a result, the first slant reflection surface 51 reflects most of the light beam that has a wavelength of approximately 650 nm that is emitted from the second light source 35, and transmits most of the light beams emitted from the first and the third light sources. 25 and 45.

Figure 2B:
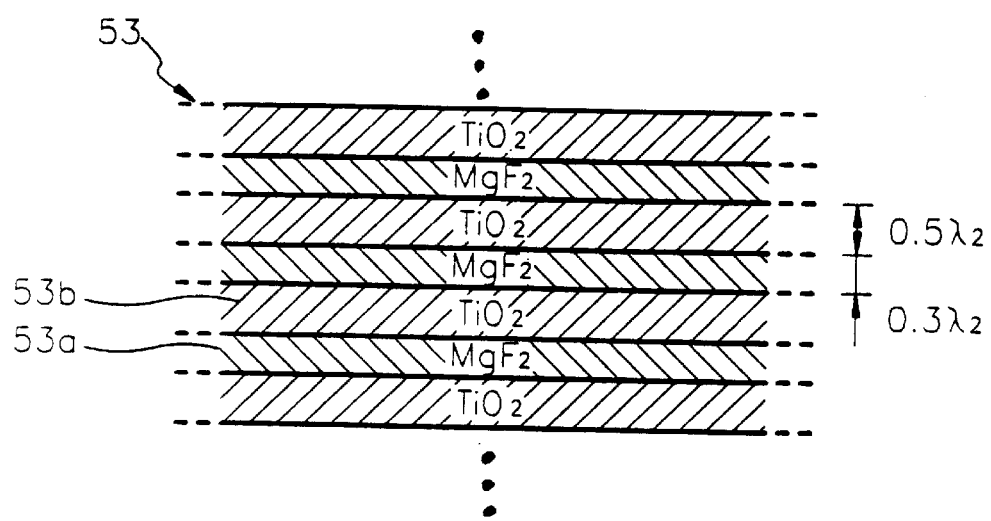

As illustrated in FIG. 2B, the second slant reflection surface 53 is formed by repeatedly alternately stacking a third dielectric layer 53a formed of $MgF_2$ which has a refractivity of approximately 1.38 and a thickness of $0.3\lambda_2$, and a fourth dielectric layer 53b formed of $TiO_2$ which has a refractivity of approximately 2.3 and a thickness of $0.5\lambda_2$, where $\lambda_2$ indicates a reference wavelength of approximately 600 nm.

If the third and fourth dielectric layers 53a and 53b are alternately stacked with twenty layers, the reflectivities of the second slant reflection surface 53 with respect to lights having wavelengths of 410 nm, 650 nm and 780 nm become approximately 0.1%, 0.9% and 96.0%, respectively. As a result, the second slant reflection surface 53 reflects most of the light beam having a wavelength of approximately 780 nm that are emitted from the third light source 45, and transmits most of the light beams that are emitted from the first and the second light sources 25 and 35.

The reflectivities of the first and the second slant reflection surfaces 51 and 53 can be controlled by changing the number of layers of the first through fourth dielectric layers 51a, 51b and 53a, 53b.

Alternatively, the first and the second slant reflection surfaces 51 and 53 may be formed by repeatedly stacking dielectric layers of $SiO_2$ and $ZrO_2$, $Al_2O_3$ and $ZrO_2$, $MgF_2$ and $ZrO_2$, $SiO_2$ and $TiO_2$ or $Al_2O_3$ and $TiO_2$, rather than $MgF_2$ and $TiO_2$.

If the position of the first light source 25 is changed with that of the second light source 35 or the third light source 45, the first or the second slant reflection surface 51 or 53 is preferably formed by repeatedly stacking a first dielectric layer (not shown) formed of $MgF_2$ having a refractivity of approximately 1.38 and a thickness of approximately $0.15\lambda_1$, and a second dielectric layer (not shown) formed of $TiO_2$ having a refractivity of approximately 2.3 and a thickness of approximately $0.25\lambda_1$, where $\lambda_1$ indicates a reference wavelength of approximately 660 nm. As a result, the first or second slant reflection surface 51 or 53 reflects most of the light that has a wavelength of 410 mn.

Therefore, if the position of the first light source 25 is changed with that of the second light source 35, the second slant reflection surface 53 reflects most of the light beam having a wavelength of 780 nm that is emitted from the third light source 45, and transmits most of the light beams having wavelengths of 410 nm and 650 nm that are emitted from the first and the second light sources 25 and 35, respectively.

Likewise, if the position of the first light source 25 is changed with that of the third light source 45, the first slant reflection surface 51 reflects most of the light beam having a wavelength of 650 nm that is emitted from the second light source 35, and transmits most of the light beams having wavelengths of 410 nm and 780 nm that are emitted from the first and the third light sources 25 and 45.

As illustrated in FIG. 1, the converging device 60 includes a first object lens 61 and a second object lens 63 corresponding to recording media 10 of different thicknesses, and an actuator 65 that selectively locates the first and the second object lenses 61 and 63 with respect to the corresponding recording media 10. The actuator 65 controls focusing and tracking positions of the first object lens 61 and the second object lens 63 with respect to the recording media 10.

The first object lens 61 is appropriate for recording and/or reproducing using a relatively thin recording medium 10a, such as a HD-DVD, and the second object lens 63 is appropriate for recording and/or reproducing using a relatively thick recording medium 10b, such as a CD. If the thickness of the HD-DVD is the same as the thickness of the DVD, the first object lens 61 may be used for recording and reproducing the DVD. When the DVD is recorded and/or reproduced by the first object lens 61 for a HD-DVD, the distance between the first object lens 61 and the second hologram element 39 is optimized so that chromatic aberration caused by a wavelength difference is corrected. If the thickness of the HD-DVD is different from the thickness of the DVD, an object lens (not shown) appropriate for being optimized with respect to the wavelength of the light beam emitted from the second light source 35 to record and/or reproduce the DVD may be further provided.

In the compatible optical pick-up apparatus of the present invention, the first light source 25 or the second light source 35 is operated during recording and/or reproducing of the HD-DVD or the DVD, and the first object lens 61 is arranged along a light path between the recording medium 10a and the dichroic beam splitter 50 by the actuator 65. The light beam that is emitted from the first light source 25 is trasmitted through the dichroic beam splitter 50, and the transmitted light beam is converged by the first object lens 61 to form a light spot on a recording surface of the recording medium 10a. Subsequently, the light beam reflected from the recording medium 10a passes through the dichroic beam splitter 50 to be input to the first photodetector 27. In addition, the light beam emitted from the second light source 35 is reflected from the first slant reflection surface 51 to form a light spot on a recording surface of the recording medium 10*a*. The light beam reflected from the recording medium 10*a* is then reflected from the first slant reflection surface 51 to be input to the second photodetector 37.

The third light source 45 is operated during recording/reproducing of a CD, with the second object lens 63 being positioned along a light path between the recording medium 10 and the dichroic beam splitter 50 by the actuator 65. The light beam emitted from the third light source 45 is reflected from the second slant reflection surface 53 of the dichroic beam splitter 50, and the reflected light is converged by the second object lens 63 to form a light spot on a recording surface of recording media 10*b*. Subsequently, the light beam reflected from the recording medium 10*b* is reflected from the second slant surface 53 to be input to the third photodetector 47.

In the above-described compatible optical pick-up apparatus, the HD-DVD, DVD family, including the DVD-R, and the CD family, including the CD-R can be compatibly employed.

Figure 3:
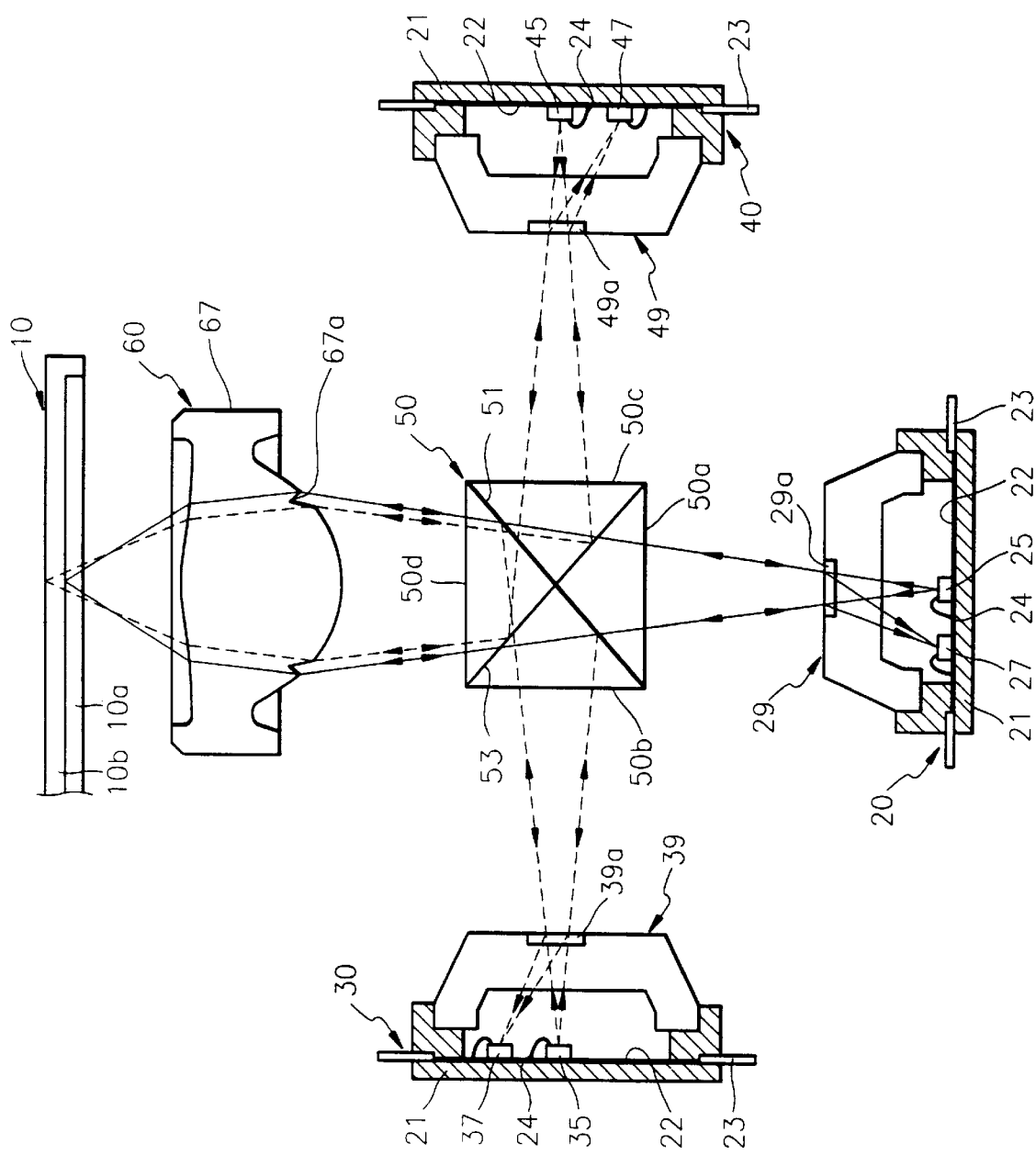
FIG. 3 is a schematic view of another type of converging device for the optical pickup apparatus of FIG. 1.

FIG. 3 is a schematic view of another type of converging device 60*a* which may be used in the optical pick-up apparatus shown in FIG. 1. As illustrated in FIG. 3, an object lens 67 in which an annular light control pattern 67*a* is formed may be employed as the converging device 60*a*. The light control pattern 67*a* may be variously modified as needed.

During operation of the optical pick-up apparatus of FIG. 3, a light beam passing through an inside portion of the light control pattern 67*a* forms a light spot on a recording surface of the relatively thick recording medium 10*b*, which may be a CD, and a light beam passing through an outside portion of the light control pattern 67*a* forms a light spot on a recording surface of a relatively thin recording media 10*a*, which includes an HD-DVD and/or a DVD.

If the thickness of the HD-DVD is different from the thickness of the DVD, a light control pattern (not shown) corresponding to the DVD may be further formed on the object lens 67.

Figure 4:
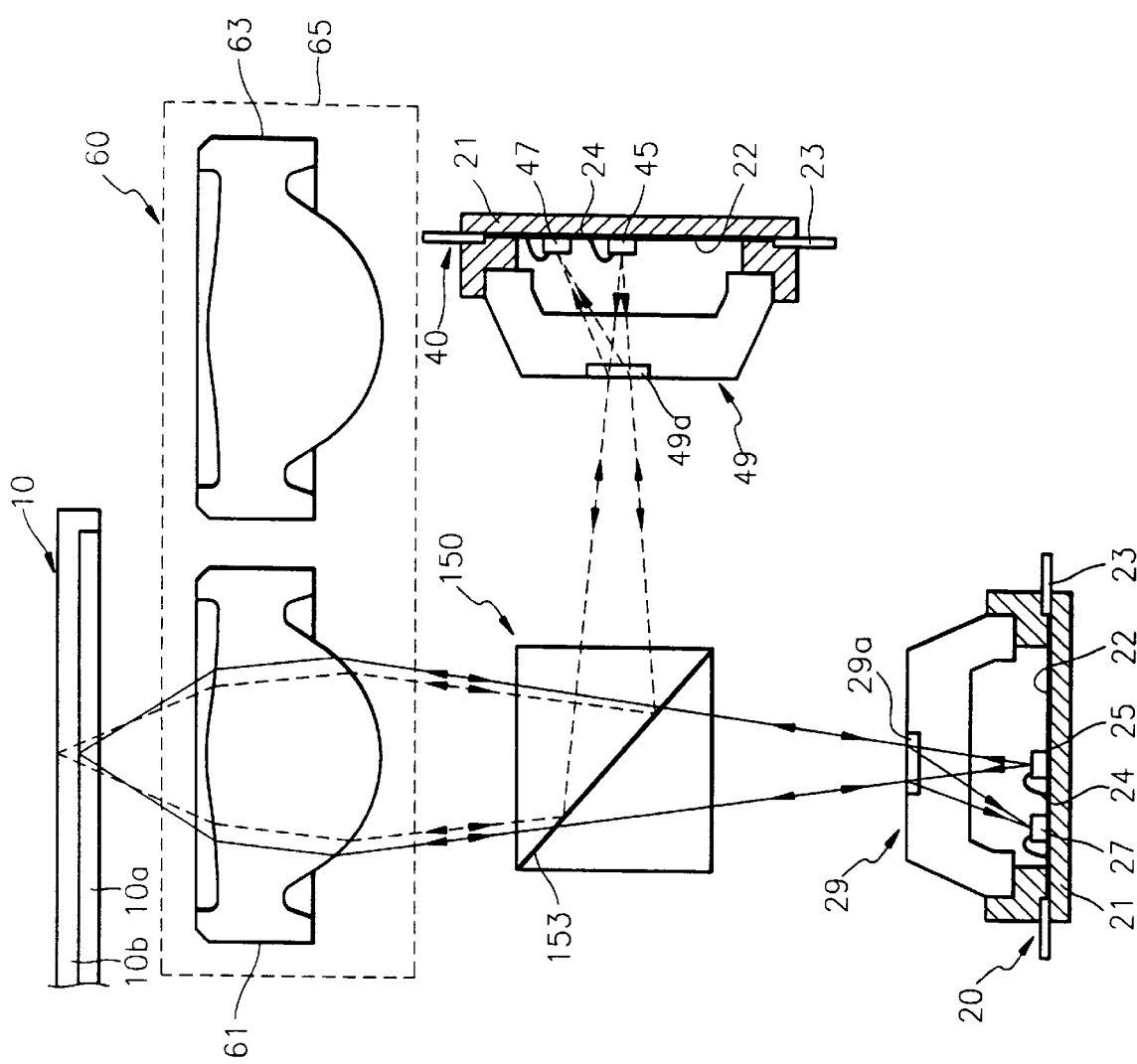
FIG. 4 is a schematic view of an optical arrangement of a compatible optical pick-up apparatus according to a second embodiment of the present invention.

FIG. 4 is a schematic view of the optical arrangement of a compatible optical pick-up apparatus according to a second embodiment of the present invention. Reference numerals of FIG. 4 that are the same as those of FIG. 1 indicate the same elements of FIG. 1, and therefore a description of those parts is omitted.

As illustrated in FIG. 4, the optical pick-up apparatus according to the second embodiment of the present invention employs a dichroic beam splitter 150 that includes a single slant reflection surface 153 that transmits and reflects a light beam emitted from the first light source 25 for a HD-DVD, and the third light source 45 for a CD. The dichroic beam splitter 150 is formed by bringing two prisms into contact with each other, and the slant reflection surface 153 is formed in the same manner as the first slant surface 53 of FIG. 1. The slant reflection surface 153 transmits most of the light beam that has a wavelength of approximately 410 nm that is emitted from the first light source 25, and reflects most of the light beam that has a wavelength of approximately 780 nm that is emitted from the third light source 45.

If a position of the first light source 25 is changed with a position of the third light source 45, the slant reflection surface 153 reflects most of the light beam that has a wavelength of 410 nm that is emitted from the first light source 25, and transmits most of the light beam that has a wavelength of 780 nm emitted from the third light source 45. The object lens 67 described with reference to FIG. 3 may be employed as the converging device 60.

During operation of the compatible optical pick-up apparatus of FIG. 4, the first light source 25 is operated during recording and/or reproduction of an HD-DVD, and the third light source 45 is operated during recording and/or reproduction of a CD. The optical pick-up apparatus can record and reproduce HD-DVD and CD related devices including a CD-R. In addition, DVD related devices, except a DVD-R, can also be recorded and reproduced by the first light source 25.

Figure 5:
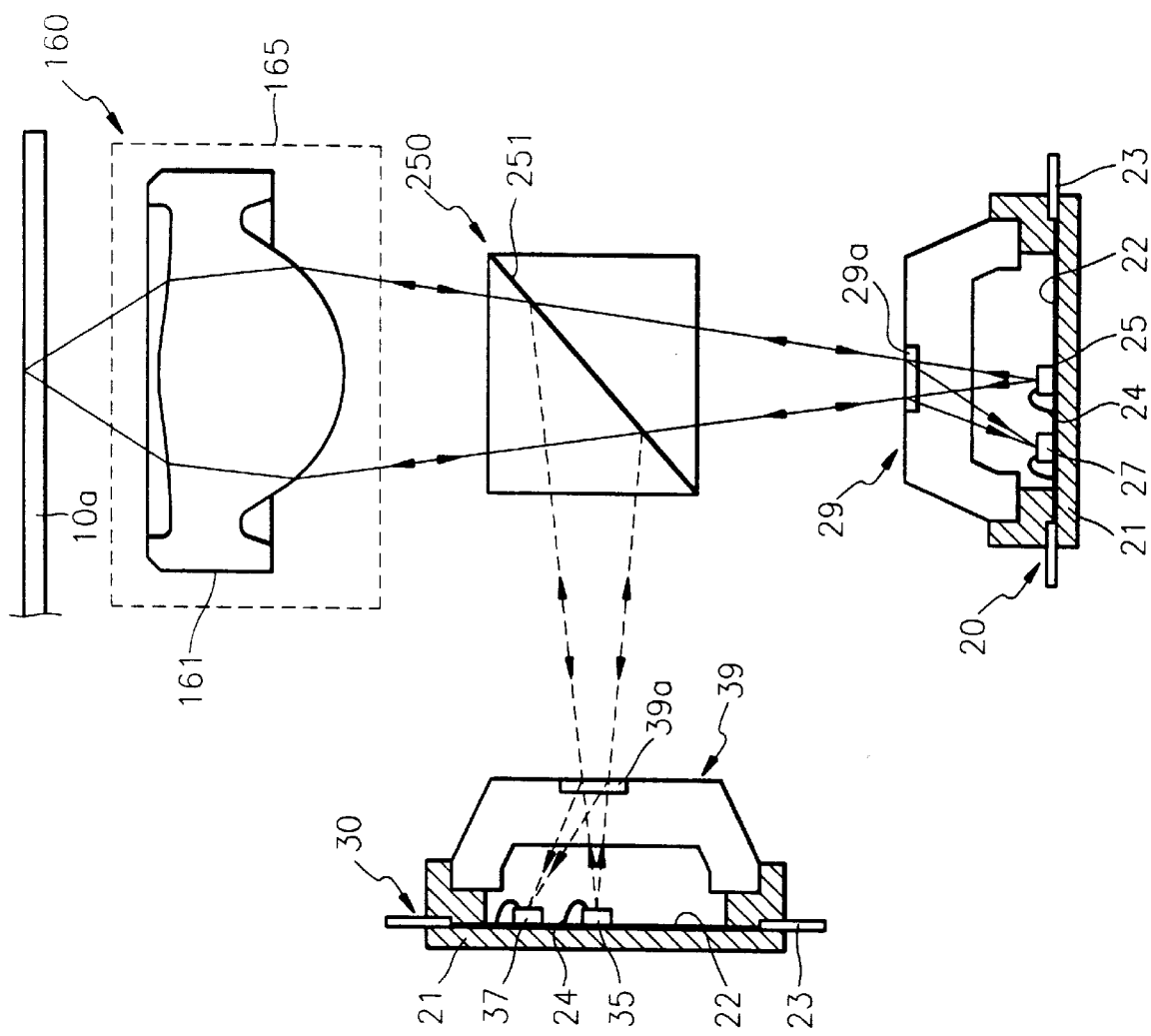
FIG. 5 is a schematic view of an optical arrangement of a compatible optical pick-up apparatus according to a third embodiment of the present invention.

FIG. 5 is a schematic view of an optical arrangement of a compatible optical pick-up apparatus according to a third embodiment of the present invention. Reference numerals of FIG. 5 that are the same as those of FIG. 4 indicate the same elements as those of FIG. 4, and therefore a description of those parts has been omitted. In the optical pick-up apparatus of FIG. 5, an HD-DVD and a DVD can be compatibly employed. That is, the optical pick-up apparatus of FIG. 5 includes the first light source 25 to emit light beams for an HD-DVD, the second light source 35 to emit light beams for a DVD, and a dichroic beam splitter 250 that includes a slant reflection surface 251 for transmitting and reflecting light beams emitted from the first and second light sources 25 and 35.

An object lens 161 appropriate for recording and/or reproducing an HD-DVD, and an actuator 165 for controlling focusing and tracking positions of the object lens 161, are employed as a converging device 160.

The dichroic beam splitter 250 is formed by bringing two prisms into contact with each other, and the slant reflection surface 251 is formed in the same manner as the first slant reflection surface 51 of FIG. 1. The slant reflection surface 251 transmits most of the light beam that has a wavelength of approximately 410 nm that is emitted from the first light source 25, and reflects most of the light beam that has a wavelength of approximately 650 nm that is emitted from the second light source 35.

If a position of the first light source 25 is changed with a position of the second light source 35, the slant reflection surface 251 reflects most of the light beam that has a wavelength of 410 nm that are emitted from the first light source 25, and transmits most of the light beam that has a wavelength of 650 nm that is emitted from the second light source 35.

During operation of the optical pick-up apparatus according to FIG. 5, the first light source 25 is operated during recording and reproduction of an HD-DVD, and the second light source 35 is operated during recording and reproduction of a DVD. The compatible optical pick-up apparatus can record and/or reproduce a DVD related device, including a DVD-R and an HD-DVD.

If the thickness of the HD-DVD is different from the thickness of the DVD, the converging device 160 also includes an object lens (not shown) that is appropriate for recording and reproducing a DVD, or an object lens (not shown) in which a light control pattern that is appropriate for an HD-DVD and a DVD is formed, may be employed.

According to the compatible optical pick-up apparatus of the present invention, a plurality of light sources radiating light beams having various wavelengths and a dichroic beam splitter for selectively transmitting and reflecting light beams having various wavelengths are provided, to thereby record information on and reproduce from recording media that have various formats.

What is claimed is:

1. An optical pick-up apparatus for recording and/or reproducing information from first through third recording media, comprising:
    a first light source to emit a light beam having a wavelength corresponding to the first recording medium when the first recording medium is accessed;
    a second light source to emit a light beam having a wavelength corresponding to the second recording medium when the second recording medium is accessed;
    a third light source to emit a light beam having a wavelength corresponding to the third recording medium when the third recording medium is accessed;
    a dichroic beam splitter having first through third input surfaces to receive the light emitted from the first through third light sources, respectively, dielectric surfaces to receive the light from the first through third input surfaces, and an output surface through which the light beams received by the first through third input surfaces and the dielectric surfaces are transmitted toward the first, the second, and the third recording media, respectively, each dielectric surface comprising repeated stacks of dielectric layers;
    a converging device to converge each of the light beams transmitted through the output surface of the dichroic beam splitter toward the respective first through third recording media; and
    first through third photodetectors to respectively receive the light beams reflected from the respective first through third recording media and which pass through the dichroic beam splitter.

2. The optical pick-up apparatus of claim 1, wherein the light beams emitted by the first through third light sources have wavelengths of approximately 410 nm, 650 nm and 780 nm, respectively.

3. The optical pick-up apparatus of claim 1, wherein the dichroic beam splitter comprises:
    a first slant reflection surface to transmit the light beam emitted from the first light source, and to reflect the light beam emitted from the second light source, toward the output surface; and
    a second slant reflection surface to transmit the light beam emitted from the first light source, and to reflect the light beam emitted from the third light source, toward the output surface.

4. The optical pick-up apparatus of claim 1, wherein the converging device comprises:
    a plurality of object lenses to converge the light beams emitted from the corresponding first, second and third light sources transmitted through the dichroic beam splitter to the first, the second, and the third recording media, respectively; and
    an actuator to selectively locate the plurality of object lenses in accordance with a thickness of the first, the second, or the third recording media to be accessed along a light path.

5. The optical pick-up apparatus of claim 1, wherein the converging device includes an object lens having an annular light control pattern.

6. The optical pick-up apparatus of claim 1, wherein
    said first through third light sources define first through third emitted light optical paths to the respective first through third recording media; and
    said first through third photodetectors define first through third reflected light optical paths from the respective first through third recording media, the first through third reflected light optical paths being substantially parallel to the first through third emitted light optical paths through said dichroic beam splitter.

7. An optical pick-up apparatus for recording and/or reproducing information from first through third recording media, comprising:
    a first light source to emit a light beam having a wavelength corresponding to the first recording medium when the first recording medium is accessed;
    a second light source to emit a light beam having a wavelength corresponding to the second recording medium when the second recording medium is accessed;
    a third light source to emit a light beam having a wavelength corresponding to the third recording medium when the third recording medium is accessed;
    a dichroic beam splitter having first through third input surfaces to receive the light emitted from the first through third light sources, respectively, and an output surface through which the light beams received by the first through third input surfaces are transmitted toward the first, the second, and the third recording media, respectively;
    a converging device to converge each of the light beams transmitted through the output surface of the dichroic beam splitter toward the respective first through third recording media; and
    first through third photodetectors to respectively receive the light beams reflected from the respective first through third recording media and which pass through the dichroic beam splitter,
    wherein:
        the dichroic beam splitter comprises:
            a first slant reflection surface to transmit the light beam emitted from the first light source, and to reflect the light beam emitted from the second light source, toward the output surface; and
            a second slant reflection surface to transmit the light beam emitted from the first light source, and to reflect the light beam emitted from the third light source, toward the output surface, and
        each of the first and the second slant reflection surfaces comprises repeatedly stacked dielectric layers, each having a refractivity different from an adjacent one of the dielectric layers.

8. The optical pick-up apparatus of claim 7, wherein the dielectric layers alternately comprise $MgF_2$ and $TiO_2$, $SiO_2$ and $ZrO_2$, $Al_2O_3$ and $ZrO_2$, $MgF_2$ and $ZrO_2$, $SiO_2$ and $TiO_2$, or $Al_2O_3$ and $TiO_2$.

9. The optical pick-up apparatus of claim 7, wherein
    one of the first and the second slant reflection surfaces comprises repeatedly alternated stacks of a first dielectric layer having a refractivity of approximately 1.38 and a thickness of $0.3\lambda_1$ and a second dielectric layer having a refractivity of approximately 2.3 and a thickness of $0.5\lambda_1$, wherein $\lambda_1$ indicates a first reference wavelength of approximately 1040 nm, and
    the other one of the first and the second slant reflection surfaces comprises repeatedly alternated stacks of a third dielectric layer having a refractivity of approximately 1.38 and a thickness of $0.3\lambda_2$ and a fourth dielectric layer having a refractivity of approximately 2.3 and a thickness of $0.5\lambda_2$, wherein $\lambda_2$ indicates a second reference wavelength of approximately 600 nm.

10. The optical pick-up apparatus of claim 7, wherein
one of the first and the second slant reflection surfaces comprises repeatedly alternated stacks of a first dielectric layer having a refractivity of approximately 1.38 and a thickness of $0.15\lambda_1$ and a second dielectric layer having a refractivity of approximately 2.3 and a thickness of $0.25\lambda_1$, wherein $\lambda_1$ indicates a first reference wavelength of approximately 660 nm, and the other one of the first and the second slant reflection surfaces comprises repeatedly alternated stacks of a third dielectric layer having a refractivity of approximately 1.38 and a thickness of $0.3\lambda_2$ and a fourth dielectric layer having a refractivity of approximately 2.3 and a thickness of $0.5\lambda_2$, wherein $\lambda_2$ indicates a second reference wavelength of approximately 600 nm.

11. The optical pick-up apparatus of claim 7, wherein
one of the first and the second slant reflection surfaces comprises repeatedly alternated stacks of a first dielectric layer having a refractivity of approximately 1.38 and a thickness of $0.15\lambda_1$ and a second dielectric layer having a refractivity of approximately 2.3 and a thickness of $0.25\lambda_1$, wherein $\lambda_1$ indicates a first reference wavelength of approximately 660 nm, and the other one of the first and the second slant reflection surfaces comprises repeatedly alternated stacks of a third dielectric layer having a refractivity of approximately 1.38 and a thickness of $0.3\lambda_2$ and a fourth dielectric layer having a refractivity of approximately 2.3 and a thickness of $0.5\lambda_2$, wherein $\lambda_2$ indicates a second reference wavelength of approximately 1040 nm.

12. An optical pick-up apparatus for recording and/or reproducing information from first and second recording media, comprising:
a first light source to emit a light beam having a first wavelength when the first recording medium is accessed, and a second light source to emit a light beam having a second wavelength when the second recording medium is accessed, the first and the second wavelengths corresponding to the first and second recording media;
a dichroic beam splitter having first and second input surfaces to receive the light beams emitted from the first and second light sources, respectively, and an output surface through which the light beams received by the first and second input surfaces are transmitted toward the first and second recording media, respectively;
a converging device to converge each of the light beams transmitted through the output surface of the dichroic beam splitter to the respective first and the second recording media; and
first and second photodetectors to respectively receive the light beams reflected from the respective first and second recording media and which pass through the dichroic beam splitter,
wherein:
the dichroic beam splitter includes a slant reflection surface consisting of repeatedly alternated stacks of first and second dielectric layers, each of the first and second dielectric layers having corresponding first and second thicknesses such that the slant reflection surface transmits and reflects the light beams emitted from the first and second light source to the output surface,
the first and second light sources emit light beams having wavelengths of approximately 419 nm and 650 nm, respectively, and
the first dielectric layer has a refractivity of 1.38 and a thickness of $0.3\lambda_1$, and the second dielectric layer has a refractivity of 2.3 and a thickness of $0.5\lambda_1$, wherein $\lambda_1$ indicates a reference wavelength of approximately 1040 nm.

13. An optical pick-up apparatus for recording and/or reproducing information from first and second recording media, comprising:
a first light source to emit a light beam having a first wavelength when the first recording medium is accessed, and a second light source to emit a light beam having a second wavelength when the second recording medium is accessed, the first and the second wavelengths corresponding to the first and second recording media;
a dichroic beam splitter having first and second input surfaces to receive the light beams emitted from the first and second light sources, respectively, and an output surface through which the light beams received by the first and second input surfaces are transmitted toward the first and second recording media, respectively;
a converging device to converge each of the light beams transmitted through the output surface of the dichroic beam splitter to the respective first and the second recording media; and
first and second photodetectors to respectively receive the light beams reflected from the respective first and second recording media and which pass through the dichroic beam splitter, wherein:
the dichroic beam splitter includes a slant reflection surface consisting of repeatedly alternated stacks of first and second dielectric layers, each of the first and second dielectric layers having corresponding first and second thicknesses such that the slant reflection surface transmits and reflects the light beams emitted from the first and second light source to the output surface,
the first and second light sources emit light beams having wavelengths of approximately 410 nm and 650 nm, respectively, and
the first dielectric layer has a refractivity of 1.38 and a thickness of $0.15\lambda_1$, and the second dielectric layer has a refractivity of 2.3 and a thickness of $0.25\lambda_1$, wherein $\lambda_1$ indicates a reference wavelength of approximately 660 nm.

14. An optical pick-up apparatus for recording and/or reproducing information from first and second recording media, comprising:
a first light source to emit a light beam having a first wavelength when the first recording medium is accessed, and a second light source to emit a light beam having a second wavelength when the second recording medium is accessed, the first and the second wavelengths corresponding to the first and second recording media;
a dichroic beam splitter having first and second input surfaces to receive the light beams emitted from the first and second light sources, respectively, and an output surface through which the light beams received by the first and second input surfaces are transmitted toward the first and second recording media, respectively;
a converging device to converge each of the light beams transmitted through the output surface of the dichroic beam splitter to the respective first and the second recording media; and
first and second photodetectors to respectively receive the light beams reflected from the respective first and second recording media and which pass through the dichroic beam splitter, wherein:
the dichroic beam splitter includes a slant reflection surface consisting of repeatedly alternated stacks of first and second dielectric layers, each of the first and second dielectric layers having corresponding first and second thicknesses such that the slant reflection surface transmits and reflects the light beams emitted from the first and second light source to the output surface, the light beams emitted from the first and the second light sources have wavelengths of approximately 410 nm and 780 nm, respectively, and the first dielectric layer has a refractivity of approximately 1.38 and a thickness of $0.15\lambda_1$, and the second dielectric layer has a refractivity of approximately 2.3 and a thickness of $0.25\lambda_1$, wherein $\lambda_1$ indicates a reference wavelength of approximately 660 nm.

15. An optical pick-up apparatus for recording and/or reproducing information from first and second recording media, comprising:

a first light source to emit a light beam having a first wavelength when the first recording medium is accessed, and a second light source to emit a light beam having a second wavelength when the second recording medium is accessed, the first and the second wavelengths corresponding to the first and second recording media;

a dichroic beam splitter having first and second input surfaces to receive the light beams emitted from the first and second light sources, respectively, and an output surface through which the light beams received by the first and second input surfaces are transmitted toward the first and second recording media, respectively;

a converging device to converge each of the light beams transmitted through the output surface of the dichroic beam splitter to the respective first and the second recording media; and first and second photodetectors to respectively receive the light beams reflected from the respective first and second recording media and which pass through the dichroic beam splitter, wherein:
the dichroic beam splitter includes a slant reflection surface consisting of repeatedly alternated stacks of first and second dielectric layers, each of the first and second dielectric layers having corresponding first and second thicknesses such that the slant reflection surface transmits and reflects the light beams emitted from the first and second light source to the output surface, the light beams emitted from the first and the second light sources have wavelengths of approximately 410 nm and 780 nm, respectively, and the first dielectric layer has a refractivity of approximately 1.38 and a thickness of $0.3\lambda_1$, and the second dielectric layer has a refractivity of approximately 2.3 and a thickness of $0.5\lambda_1$, wherein $\lambda_1$ indicates a reference wavelength of approximately 600 nm.

16. An optical pick-up device to record and/or reproduce information from a plurality of recording media of different formats, one of which is to be accessed at a given time, the optical pick-up device comprising:

first, second, and third light sources to emit light beams of different wavelengths corresponding respectively to the plurality of recording media, depending upon which one of the plurality of recording media is to be accessed;

a dichroic beam splitter including first and second slant reflection surfaces oblique to the light beams of the first, second, and third light sources and which selectively reflect and transmit the light beams of first, second, and third light sources based upon the wavelengths of the light beams of the first, second, and third light sources;

a converging device to converge each of the light beams transmitted from the dichroic beam splitter to the recording media; and a plurality of photodetectors to respectively receive the light beams reflected from the plurality of recording media and which pass through the converging device and the dichroic beam splitter and are incident upon the at least one slant reflection surface, wherein:
the first slant reflection surface comprises repeatedly alternated stacks of first and second dielectric layers, wherein the first and second dielectric layers have different refractivities, the first slant reflection surface transmits the light beam emitted from the first light source, and reflects the light beam emitted from the second light source, toward the output surface, and the second slant reflection surface comprises repeatedly alternated stacks of third and fourth dielectric layers, wherein the third and fourth dielectric layers have different refractivities, the second slant reflection surface transmits the light beam emitted from the first light source, and reflects the light beam emitted from the third light source, toward the output surface.

17. An optical pick-up device to record and/or reproduce information from a plurality of recording media of different formats, one of which is to be accessed at a given time, the optical pick-up device comprising:

first and second light sources to emit light beams of different wavelengths corresponding respectively to the plurality of recording media, depending upon which one of the plurality of recording media is to be accessed;

a dichroic beam splitter including a slant reflection surface oblique to the light beams of the first and second light sources and which selectively reflects and transmits the light beams of the first and second light sources based upon the wavelengths of the light beams of the first and second light sources;

a converging device to converge each of the light beams transmitted from the dichroic beam splitter to the recording media; and a plurality of photodetectors to respectively receive the light beams reflected from the plurality of recording media and which pass through the converging device and the dichroic beam splitter and are incident upon the at least one slant reflection surface, wherein the slant reflection surface consists of repeatedly alternated stacks of first and second dielectric layers, wherein the first and second dielectric layers have corresponding first and second thicknesses, the slant reflection surface transmits the light beam emitted from the first light source, and reflects the light beam emitted from the second light source.

* * * * *